United States Patent
Viero et al.

(10) Patent No.: US 8,223,769 B2
(45) Date of Patent: Jul. 17, 2012

(54) METHOD AND CIRCUITRY FOR PROCESSING DATA

(75) Inventors: Timo Viero, Espoo (FI); Tarja Kitti, Kemi (FI)

(73) Assignee: Nokia Siemens Networks Oy, Espoo (FI)

( * ) Notice: Subject to any disclaimer, the term of this patent is extended or adjusted under 35 U.S.C. 154(b) by 1020 days.

(21) Appl. No.: 10/427,997

(22) Filed: May 2, 2003

(65) Prior Publication Data

US 2004/0037285 A1 Feb. 26, 2004

Related U.S. Application Data

(63) Continuation of application No. PCT/IB02/02515, filed on May 3, 2002.

(51) Int. Cl.
*H04L 12/28* (2006.01)

(52) U.S. Cl. ........................................................ 370/392

(58) Field of Classification Search .................. 370/231, 370/266, 335, 42, 47, 349, 51, 55, 362, 89, 370/92, 393, 95.31, 40, 3, 71, 475, 913, 916, 370/342, 347, 389, 392, 395.31, 400, 403, 370/471, 351, 390; 455/3, 73, 82, 88, 561, 455/62, 575, 151, 3.01, 562.1, 575.7, 151.2; 709/238, 242, 249

See application file for complete search history.

(56) References Cited

U.S. PATENT DOCUMENTS

| 6,185,199 B1 * | 2/2001 | Zehavi ........................... 370/335 |
| 6,366,961 B1 | 4/2002 | Subbiah et al. |
| 6,763,038 B1 * | 7/2004 | Usui et al. ..................... 370/506 |
| 2002/0001293 A1 | 1/2002 | Kim |
| 2002/0146007 A1 * | 10/2002 | Chang et al. .................. 370/390 |

FOREIGN PATENT DOCUMENTS

| EP | 0 998 052 A2 | 5/2000 |
| EP | 1 094 677 A1 | 4/2001 |
| WO | WO 99/09657 | 2/1999 |
| WO | WO 01/95567 | 12/2001 |

* cited by examiner

*Primary Examiner* — Nittaya Juntima
*Assistant Examiner* — Leon Andrews
(74) *Attorney, Agent, or Firm* — Squire Sanders (US) LLP (57) ABSTRACT

The invention provides circuitry for processing and routing data and comprises an input configured to receive data, one or more summing units configured to sum at least some of the data and a plurality of outputs configured to output the summed data. The one or more summing units are configured to route the summed data to one or more of the outputs.

33 Claims, 6 Drawing Sheets

METHOD AND CIRCUITRY FOR PROCESSING DATA

This is a Continuation of International Application No. PCT/IB02/02515 filed May 3, 2002, which designated the U.S. and was published under PCT Article 21(2) in English.

FIELD OF THE INVENTION

The present invention relates to a method and circuitry for processing data and in particular, but not exclusively to the processing of data packets in a base transceiver station of a wireless telecommunications system.

BACKGROUND OF THE INVENTION

Wireless cellular networks are known. The area covered by the network is divided up into cells. Each cell is created by a base transceiver station BTS which is arranged to communicate with mobile devices such as, for example, mobile telephones, located in the cells A number of different standards are known which govern the communication between mobile stations and base stations as well as with other network elements. One example of a currently known standard is the GSM standard (global system for mobile communication). This is a so-called second generation standard. At the present time, work is being carried out on the so-called third generation standard. In general, these third generation standards use code division multiple access CDMA in the radio interface between mobile stations and base transceiver stations. One of the current proposals for a third generation standard suggest using wide band CDMA (WCDMA) in the communication. With CDMA, a stream of bits or data has a spreading code applied thereto. The spreading codes distinguish the data intended for different mobile stations in the same cell and accordingly, the same frequency can be used at the same time to transmit the data to the mobile stations. Likewise, a number of mobile stations can transmit to the base station at the same time, in the same frequency band with the data being distinguished by different spreading codes. A single WCDMA BTS may support (create) one or several cells. A WCDMA cell is can be defined as a frequency and a given geographic area where the P-CCPCH (Primary-Common Control Physical Channel) can be received by a mobile station or the like.

There exist baseband and radio frequency RF processing units in a base transceiver station. Baseband processing units receive (bit) messages from a core network and prepare them for transmission via an air interface for example by performing channel encoding and spreading functionality. In some cases, modulation and upconversion, typically to an intermediate frequency, may be done at the baseband part of the base transceiver station. RF processing units convert the baseband signal up to the final radio frequency (which is around 2 GHz). Additionally, processing units that transfer data between the baseband and RF processing units may be needed. The data is passed between nodes in the base station in packet form.

The packet has a header part and a payload part. The header part will typically contain information such as address information, time stamp information and information identifying the type of data contained in the payload. The payload simply contains the message or data intended for the mobile station or base station.

The base station also provides a routing function and directs packets to the appropriate modulator for modulation, upconversion and transmission It should be appreciated that a base station will transmit on a number of different frequencies at the same time. Accordingly, different modulators may be provided for the different frequencies.

The base station can be regarded as being made up of a number of bus nodes. A received base band packet will pass through several of the nodes in order to be up converted to the radio frequency. The nodes may be provided by ASICs (application specific integrated circuits) or the like. It should be appreciated that one ASIC may provide more than one node.

It has been appreciated by the inventors that providing routing between the nodes and sufficient capacity on that routing for the various different packets requires a large resource. This is undesirable in that this increases the complexity of the base station as well as its size. In other words, a large amount of band width is required for data transfer from baseband to RF, and vice versa.

Another potential problem with base stations relates to latency. In particular, for CDMA or wide band CDMA, it is important to minimise the latency of the data packets passing through the base transceiver station.

SUMMARY OF THE INVENTION

It is an aim of embodiments of the present invention to address or at least mitigate at least one of the problems discussed previously.

According to one aspect of the present invention, there is provided circuitry for processing and routing data comprising:
  input means for receiving data;
  means for summing at least some of said data;
  a plurality of outputs for outputting said summed data, said summing means arranged to route said summed data to one or more of said outputs.

Preferably, said data includes address information.

Preferably, said data comprises packet data. The packet data may comprise a header and a payload. Preferably, the header comprises at least one of the following fields: address information, information identifying the type of data in the payload; and a time stamp.

Preferably, the means for summing is arranged to sum the payloads of a plurality of packets. The summing means are arranged to sum together data of packets with the same header or different headers. The summing of data may be based on external rules.

The summing means may be arranged to sum data of packets with different addresses, different types of data and/or different time stamps.

A at least one of said outputs may output a packet comprising the summed data and the said same header.

Preferably, means are provided for extracting the address information from said data. The extracting means may be arranged to start extracting the address information before all of a packet is received.

Preferably said payload is summed at the same time or after the header has been output by at least one of said outputs.

Preferably, said input means comprises a plurality of inputs and said summing means is arranged to take into account the identity of the input means when summing the data.

Preferably, means are provided for identifying one or more of said outputs of said circuitry.

Preferably, said identifying means comprises a look up table.

Preferably, separate summing means are provided for each output.

Preferably, wherein the data to be summed is directed to the summing means associated with the identified output.

Preferably, said summing means is provided with a plurality of adder stages.

Preferably, said data comprises spread spectrum data.

Preferably, the data which is summed together is such that the different data of the summed data can be distinguished from each other.

According to another aspect of the invention, there is provided circuitry for processing data comprising:
  input means for receiving data, said data including address information;
  comparing means for comparing address information of different data:
  means for summing at least some of said data in dependence on said comparison;
  output means for outputting said summed data.

According to another aspect of the invention there is provided circuitry for processing and routing data comprising:
  input means for receiving data,
  means for summing at least some of said data;
  output means for outputting said summed data, wherein at least some data is summed as at least some data is output.

According to another aspect of the invention, there is provided circuitry for processing and routing data comprising:
  input means for receiving data;
  means for summing at least some of said data;
  output means for outputting said summed data wherein said circuitry is arranged to process and route data substantially simultaneously.

According to another aspect of the invention, there is provided a method for processing and routing data comprising the steps of:
  receiving data;
  summing at least some of said data;
  routing said summed data to at least one of a plurality of outputs.

In embodiments of the present invention a message based bus protocol may be used for data transmission between baseband and RF units within the base transceiver station. In each message, data of single or several mobile stations or the like are transferred between baseband and RF units depending on the air interface standard that is supported. In the case of W-CDMA, a message may contain data of several users. It is also possible that GSM messages may also contain data of several users. The content of each packet may reflect the format which is used in the air interface between BTS and mobile station.

BRIEF DESCRIPTION OF DRAWINGS

For a better understanding of the present invention and as to how the same may be carried into effect, reference will now be made by way of example only to the accompanying drawings in which.

DETAILED DESCRIPTION OF EMBODIMENTS OF THE PRESENT INVENTION

Figure 1:
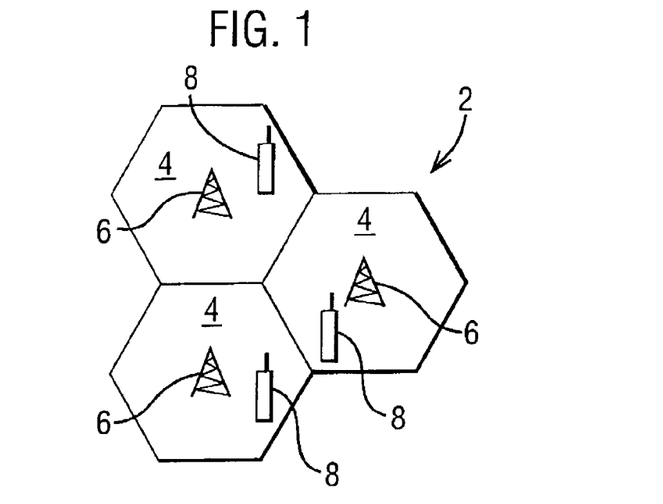
FIG. 1 shows a schematic view of a cellular telecommunications system in which embodiments of the present invention may be incorporated.

Reference is made to FIG. 1 which shows schematically a cellular telecommunication system in which embodiments of the present invention can be incorporated. The area covered by the network 2 is divided into a plurality of cells 4. Each cell is created by a base transceiver station 6 which is arranged to communicate with user equipment 8 by a radio interface. The user equipment can take any suitable form and may be fixed or mobile equipment. The user equipment may for example be a mobile station, mobile terminal, mobile telephone, computer, personal computer (PC), portable computer such as a laptop computer; a personal digital assistant (PDA) or the like.

Embodiments of the present invention will be described in the context of a system which uses CDMA. Embodiments of the present invention may be used with any suitable type of CDMA such as wide band CDMA (W-CDMA), CDMA using frequency division duplexing FDD or time division duplexing TDD. The frequency division duplexing and/or the time division duplexing may be used in conjunction with wide band CDMA. Embodiments of the present invention are particularly applicable to spread spectrum techniques which use spreading codes.

Figure 2:
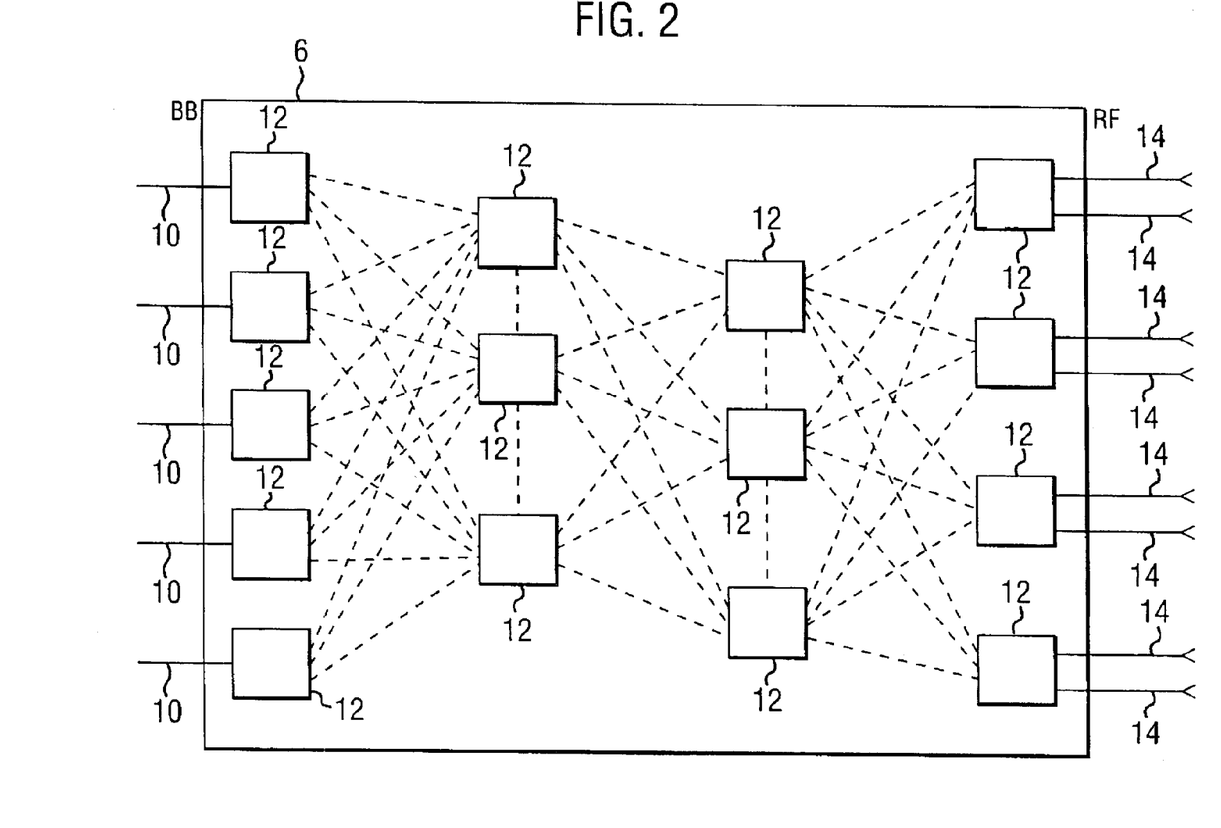
FIG. 2 shows a schematic view of a base transceiver station in which embodiments of the present invention can be incorporated.

Reference is made to FIG. 2 which schematically shows a base transceiver station 6 in which embodiments of the present invention can be incorporated. The base transceiver station 6 has input ports 10 arranged to receive inputs from other elements of the network. In particular, the ports 10 are arranged to receive inputs from core network (CN) elements, possibly through other processing blocks of the base station, such as a mobile switching services controller (MSC) or a signalling GPRS (general packet radio service) support node (SGSN) or the like.

The input data is in the form of packet data as specified in the respective air interface standard. A baseband node receives the packets, does processing such as channel encoding, spreading and upconversion, and packs the data to the packet format discussed hereinafter for transmission to RF nodes. The structure of the data packets used in the base station will be discussed hereinafter. These packets contain data or the like intended for various mobile stations served by the base transceiver station. These base band data need to be processed to provide output data at the required radio frequency with the required modulation.

The base station can be regarded as being made up of a number of nodes 12. These nodes are connected together either using point to point connections or by using a bus arrangement. The arrangement shown in FIG. 2 shows point to point connections for illustrative purposes but in practice a suitable bus arrangement would be provided. The data received from the input ports 10 are passed through various nodes of the base station 6, in packet form, and are up converted in for example a modulator at the RF part of the base station. As will be described in more detail hereinafter embodiments of the present invention are arranged to combine various of the packets sent between the base band an radio frequency parts of the base station well before or just before they are transmitted by the antennas 14 to the mobile station. In preferred embodiments of the present invention, packet combining takes place in as many nodes as possible, which may be all nodes. This gives the advantage that the bandwidth over each link is reduced.

The nodes 12 may each be provided by an ASIC. Alternatively or additionally, two or more nodes may be contained in one ASIC. Nodes may be provides by elements other than ASICs.

Figure 3:
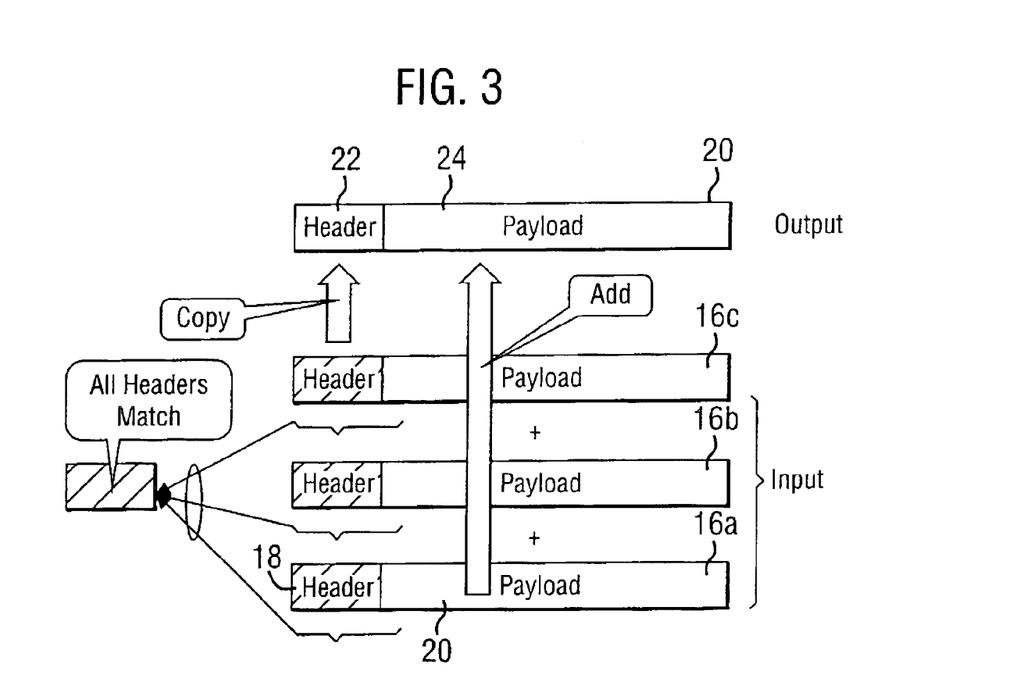
FIG. 3 illustrates the principle of embodiments of the present invention.

Reference is made to FIG. 3 which schematically illustrates the principle embodiments of the present invention. FIG. 3 shows three input packets 16a, 16b and 16c. Each packet comprises a header 18 and a payload 20. The header has the following information: address information; time stamp information; and type information which indicates the type of information contained in the payload. The payload 20 is data. It should be appreciated that the header may omit the time stamp information and/or the type information, depending on the embodiment of the invention. The header may alternatively or additionally include further information.

In preferred embodiments of the present invention, the address information can be regarded as identifying the frequency and antenna to which the data is to be transmitted. Alternatively, the address information can be regarded as identifying the modulator part of the base transceiver station (that is one of the nodes shown in FIG. 2) which modulates the packet and then transmits it. In embodiments of the present invention, a data packet which is intended for mobile station A will have the same address as the data packet intended for mobile station B if they are to receive the packets from the same base station on the same frequency and from the same antenna. The time stamp information indicates the time of the packet. Successive packets for the same mobile station will have different time stamps.

The type information indicates the type of data carried in the payload 20. For example, this information will indicates if the data is CDMA data and, if so, what type. For example, the data could be W-CDMA/FDD data. W-CDMA/TDD or some other type of CDMA data Alternatively, the data may be GSM data or any other type of data.

In embodiments of the present invention, the headers of the packets are compared. In the example shown in FIG. 3, the headers of three packets are compared. However, it should be appreciated that this technique can be used with as few as two packets or many more packets. The comparison step checks if the headers are the same, that is if they have the same address information, the same time stamp information and the same type information. If the headers are the same and external information, which has been beforehand provided for a bus multiplexer (discussed in more detail hereinafter), allows this type of data to be summed together, then the payloads of the packets are summed together. The summed payloads provide a payload 24 of a new packet 20. The header from one of the packets 16a to 16c is copied and provides the header 22 of the new packet 20. In the summing step, the bits of the payload of the first packet 16a are summed with the bits of the second packet 16b and the bits of the payload of the third packet 16c. In this way, a considerable compression of data is achieved in that the number of packets is reduced, in the example shown in FIG. 3, from 3 to 1. In more detail, there are one or several samples (complex numbers) in the payload of each message. Samples from each message (16a-16c), which correspond to the same time instant, are summed together.

CDMA uses spreading codes to distinguish data intended for different users. This means the data intended for different users can be sent at the same time on the same frequency but the receivers, that is, for example, the mobile stations are able to distinguish the data because different spreading codes are used. With the known base stations, the packets intended for the different users are transmitted by the antennas as the same time. Effectively, a summing is achieved just before modulation/upconversion. This contrasts with embodiments of the present invention, where the packets are summed before they are transmitted in every node of the base station or at least in as many nodes as possible. Thus, embodiments of the present invention combine together the CDMA payload data in each node.

In preferred embodiments of the present invention, the payloads of the packets are summed together only when the headers are identical. This means that the header of the combined packet is a copy of the common headers of the packets. This makes the determination of the headers very simple. However, more complicated possibilities exist. For example, the payloads may be summed together even where the headers are not identical. For example, in some embodiments of the present invention, the time stamp need not be the same. Whilst it is preferred that packets be combined which are to be transmitted at the same time, some embodiments of the present invention may have a tolerance built in. This tolerance will permit packets having similar time stamps, with predefined bounds to be summed. In alternative embodiments of the present invention, time stamps may be quite different where the packets are combined. The type of data may not be identical in alternative embodiments of the present invention. For example, the data may be two different types of CDMA data. Generally, the data will need to be of a type which can be distinguished from the data with which it is combined by for example the use of a spreading code or the like.

The address data will usually need to be identical However, this will depend on the particular embodiment of the present invention and what the address data represents. It may for example be possible to combine data where part of the address data matches. For example, a portion of the address may be different indicating that two or more messages contain e.g. WCDMA data at different frequencies (different sub-node addresses may indicate different frequencies). After summing there is a multi-carrier signal. In this concept, it is assumed that the signal has been converted from baseband to RF already in the baseband processing units. As mentioned above the type may also be different. It may be possible to have a multi-carrier signal where WCDMA would be at carrier frequency f1 and CDMA at carrier frequency f2 and GSM/EDGE at carrier frequency f3.

Where the packets have been upconverted to different frequencies, for example intermediate frequencies or radio frequencies, it is possible to combine GSM packets together. In this case, the different frequencies of the different messages allow the different messages to be distinguished. The upconversion to intermediate frequencies can take place in the baseband part of the base station.

For those embodiments where the header is not identical, the header may be at least partially summed. Alternatively or additionally, the additional information may be provided in an extended header and/or in the payload field. More preferably a new header would be generated from the input headers from predefined rules.

Figure 4:
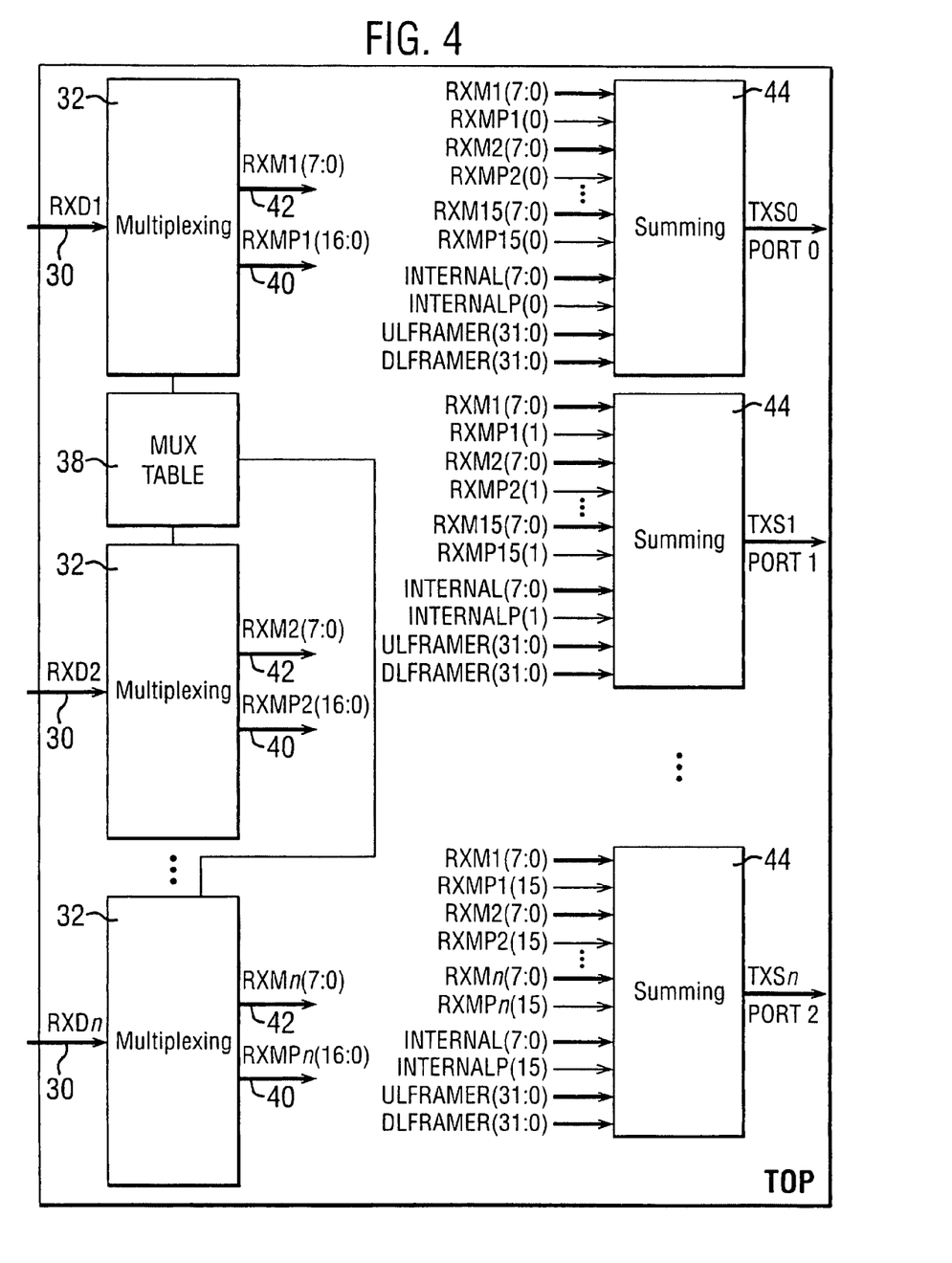
FIG. 4 shows a block diagram of an embodiment of the present invention.

Reference is now made to FIG. 4 which shows a block diagram of embodiments of the present invention. The elements shown in FIG. 4 may be provided in a common node. Alternatively, the elements shown in FIG. 4 may be provided in different nodes.

The packet data is received via input 30 and is input to a multiplexer 32. In FIG. 4, three multiplexers and their data input are shown. It should be appreciated that in alternative embodiments of the present invention, more or less than three multiplexers will be provided, typically more. The data which is input to the multiplexer 32 is input byte by byte with each byte being input in serial.

Figure 5:
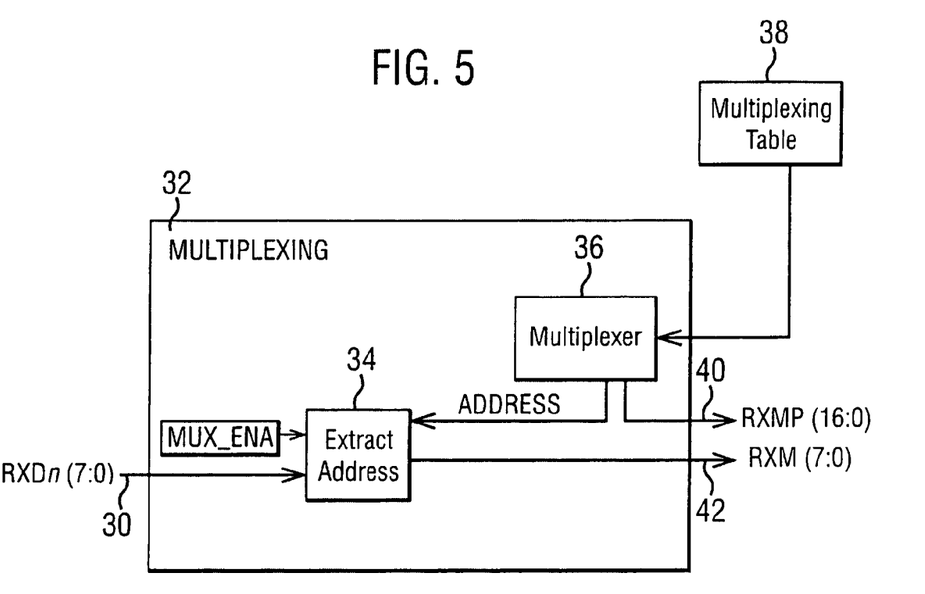
FIG. 5 shows part of the embodiment of FIG. 4 in more detail.

Reference is made to FIG. 5 which shows the multiplexer 32 of FIG. 4 in more detail. The input data is input to an address extractor 34. The address extractor 34 is arranged to extract the address from the header of the received data. The extracted address is output to the part of the multiplexer which provides the multiplexing function 36. The extracted address is used by the multiplexing function 36 as an address for a lookup table or multiplexing table 38. The output of the lookup table provides the identity of the output ports to which the data should be directed, based on the address. The output provided by the multiplexing function 36 identifies the port or ports to which the data is to be output. The address extracting unit 34 is arranged to output the packet. It should be appreciated that the packet is unchanged as it passes through the multiplexer 32.

It should be appreciated that the same lookup table 38 may be used by all of the multiplexers 32. Alternatively, copies of the same lookup table may be used by the multiplexers 32. It should also be appreciated that the look up table may be modified or updated as required to take into account the current circumstances. The multiplexing table 38 thus provides routing information.

It should be appreciated that when the data arrives in the multiplexer 32, it is buffered until the address is extracted. The address extractor unit 34 may have that buffering capacity. Alternatively, a separate buffer may be provided. The buffered data is then output as soon as the port information is available.

Depending on the port, the packet is directed to one or a number of summing units 44. The number of summing units 44 may be the same or different from the number of output ports. Output port here indicates for example a connection to another node. In the embodiment illustrated in FIG. 4, three summing units 44 are provided. It should be appreciated that in preferred embodiments of the present invention, the number of summing units 44 is equal to the number of output ports.

The summing units 44 will now be described in more detail with reference to FIG. 6.

Figure 6:
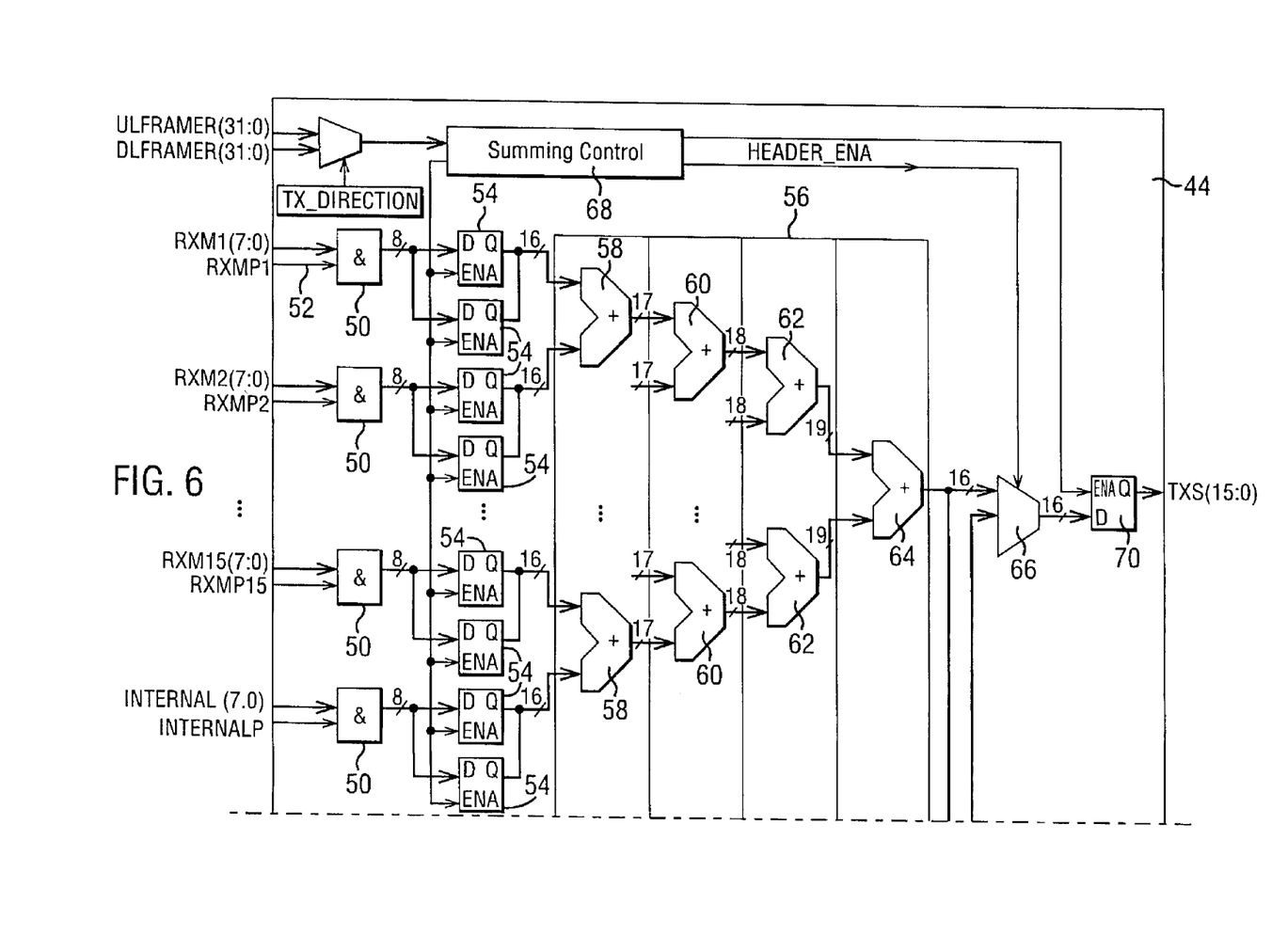
FIG. 6 shows the summing unit 44 of FIG. 4 in more detail.

Reference is made to FIG. 6 which shows one of the summing units 44 of FIG. 4 in more detail. The summing unit 44 has a header checking unit 46. The header checking unit 46 is arranged to check the header for errors. To this end, the header checking unit 46 is arranged to receive the data packet and to extract the header. Alternatively, since the header is the first part of the packet, the header checking unit 46 may be arranged to receive the first N bits of a packet, the header being contained in those N bits. In preferred embodiments of the present invention, the packet is disassembled with the header going to the header checking unit 46. The payload is sent to summing circuitry of the summing unit 44 at the same time as the header is sent to the header checking unit. The data is buffered in the summing part, by for example flip flops, or in any other suitable location until the header checking unit has completed its checks. The summing part will be described in more detail hereinafter.

The header checking unit 46 is arranged to verify the header fields. In particular, the header checking unit is also arranged to carry out the comparison of the headers of the packets input to the summer. A first output is provided if there is no error, that is all of the headers are the same. If there is a mismatch in the address field, then a first error is output. If there is a mismatch in the type field between the headers of the different packets, then a second error is output, likewise if there is a mismatch in the time stamps fields a third error is output.

The header checking unit 46 is also arranged to provide a fourth and fifth error message respectively if there is overflow in the summing or underflow in the summing. The output of the summing stage may provide a 19 bit summing result. In the example described later, full precision 16 adding is used. This means that the 16 least significant bits are taken from the summing result. According to the sign bit, that is the most significant bit the remaining bits are checked. From this it is possible to determine if there is an overflow or an underflow, depending on the sign bit. For this purpose, there is an output 65 from the adder stage to the header checking unit. An illustrative example of this follows: A 5 bit vector 00001 is summed with 01000. This gives the result 01001. This need to be in a 3 bit output. Checking the most significant bit tells us that the number is a positive number. Checking the fourth bit, which is 1, tells us that there is an overflow. If the fourth bit had been 0, then it would have been determined that there is no overflow. This similarly applies to negative numbers and underflows.

A sixth error is also provided if the time stamp is not incremented. Additionally, if the time stamp, for example for a GSM type message, is not incremented from a previous message's time stamp, an error is also indicated.

It should be appreciated that in embodiments of the present invention, the time stamp field must be incremented for each packet otherwise an error is indicated.

Finally, a seventh error is provided if the headers of the packets indicate that the packets should be going to different ports. In this mode, the packets are not summed together but are individually output. This is the so-called bypass node. In the bypass mode, only one input port can be multiplexed to the same output port at the same time. If two more input ports try to multiplex to the same output port, where there is no summing, an error is indicated and the empty message is sent forward.

The header checking unit 46 is provided with a header enable signal. Finally, the header checking unit 46 provides an output 48. This is the common header which is to be added to the summed data.

The packets which are to be summed, and in particular the payloads are input to respective AND gates 50 along with an enable signal 52. If the enable signal is high, then the AND gate 50 will pass the payload data therethrough. In preferred embodiments of the present invention, an AND gate 50 is used for each payload which is to be summed. Each AND gate 50 is connected to the input of two flip-flops 54. The function of the pair of flip-flops 54 connected to the output of each AND gate 50 is to convert the data from an 8 bit form to a 16 bit form.

The output of the two flip-flops, providing the 16 bit data is input to a summer stage 56. The summer stage 56 consists of a number of adder stages in a tree formation. This is well known in the art. The number of adder stages will depend on the number of payloads to be added together. Each stage consists of a number of adders 58. The adders in the first stage are arranged each to receive two inputs, one input being from one pair of flip-flops 54 associated with one AND gate 50 and the other input being the output from another pair of flip-flops 54 associated with a second AND gate 50.

The adders of the first stage 58 are arranged to provide an output to an adder 60 of a second stage. Each adder of the second stage is arranged to receive the output of two adders from the first stage. Likewise, each of the two adders 62 of the third stage are arranged to receive the output of two adders of the second stage. The fourth stage has a single adder 64 which is arranged to receive the output of the two adders 62 defining the third stage 64. This provides output 65 to the header checker unit 46 discussed previously. The summed payload is also output to a multiplexer 66 which is also arranged to receive the common header output via output 48 from the header checking unit 46. To reassemble the packets, the header is first output followed by the combined data packet. The multiplexer 66 is controlled by a control signal from the summing control unit 68 which provides a selection signal to the multiplexer 66 and also provides enable signals to the various flip-flops. The summing control unit has inputs for downlink DL (BB to RF) and uplink UL timing parameters.

The output of the multiplexer 66 is input to a flip-flop 70 which controls the output of the combined packet by the output. The summing control unit 68 again provides the enable signal for the flip-flop 70.

It should be appreciated that embodiments of the present invention have the following advantages. When integrating the summing functionality with the bus multiplexer or router, latency through the multiplexer can be decreased. Thus, data transfer over the bus has longer latency, if in each bus node, data must be taken away from the bus for summing after which it is retransmitted to the bus. In contrast, in embodiments of the present invention, it is not necessary to receive the entire packet in the multiplexer before extracting the relevant port information. This can be done by taking the relevant address information from the packet as soon as it is received. Whilst the header is being processed, the remainder of the packet can be received and then directed in accordance with the address looked up in the lookup table.

The summing of the packets can take place well before the packets reach the modulator. Alternatively, the data can be transmitted without any summing from the base band processing to the radio frequency end of the base station. Summing would then be performed in the modulator before transmitting the data to analogue RF parts.

It should be appreciated that by having an integrated multiplexer and summer, the latency can be reduced. It is possible in embodiments of the present invention that the node provide summing and routing functions substantially simultaneously. In other words the header can be output while the data is summed. Additionally or alternatively, the header can be processed as soon as it is received without necessarily having to wait for the whole packet to be received. Advantages may be achieved by embodiments of the invention which integrate the functions of the multiplexers and the summers.

The summing of the data may be based on external rules. The rules may be provided by base transceiver station control entity which is in charge of the control of the whole base transceiver station BTS. The rules depend on the inherent properties of air interface standards that are supported by the BTS. Also technologies and signal processing operations utilized by the BTS have an impact on the summing rules. For example, WCDMA and CDMA packets are summed together because that is beneficially based on the code division property of these air interface standards. GSM/EDGE messages are not summed if modulation and upconversion is done at RF processing units. Note that time and frequency separates GSM/EDGE calls from each other. Summing of GSM/EDGE may be done if modulation and upconversion to intermediate frequency is done already at baseband processing units. Thus, frequency (and time) separation is already generated by the baseband processing units.

Embodiments of the present invention have been described in the context of packets of data. However, it should be appreciated that it is possible to achieve similar results where the data is in the form of a sequence of bit where the sequence of bits can be received from separate sources, summed together and transmitted to the next node. It should be appreciated that in this case, there will be some control information which will indicate the address or the like which will need to be considered when summing together bits from two or more sources, for example data synchronization marks/frame indicators.

The indices of input ports (constant stream of data seen at each port may contain multiplexed transmissions of several separate streams) may be taken into account by the summing means.

Embodiments of the present invention have been described in the context of packets which are transmitted from the base band nodes or processing units to the radio frequency nodes. It should be appreciated that in some embodiments of the present invention, the packets may be from the radio frequency to the base band.

Embodiments of the present invention have been described particularly in the context of a base transceiver station. It should be appreciated that embodiments of the present invention can be used in any other suitable node in a telecommunications system. For example, embodiments of the present invention can be used in any of the other elements of the network, including the mobile station, the mobile services switching centre of the like.

It should be appreciated that embodiments of the present invention may have wider application than in a wireless telecommunications network and indeed may be used in any suitable communications network.

Embodiments of the present invention have been described in the context of a CDMA system. It should be appreciated that embodiments of the present invention may be used with systems other than CDMA. In particular, embodiments of the present invention can be used to add together data from different packets or bit streams. The data will have to be of the type where it is possible to be separated again by the receiver of the data. In case of the multicarrier example, it is the frequency that separates the signals.

The invention claimed is:

1. An apparatus, comprising:
   one or more inputs configured to receive a plurality of data packets, said data packets comprising payload data and address information;
   one or more summing units configured to arithmetically sum at least a portion of original payload data of at least two of said data packets in dependence on a comparison of the address information of said at least two data packets to generate new payload data, said new payload data taking the place of said original payload data of said at least two of said data packets; and
   a plurality of outputs configured to output said new payload data in place of original payload data used in its generation, said summing units being configured to route said new payload data to one or more of said plurality of outputs.

2. The apparatus as claimed in claim 1, wherein said data packets comprise a header, said header comprising said address information.

3. The apparatus as claimed in claim 2, wherein said header comprises at least one of the following fields: information identifying a type of data in the payload, and a time stamp.

4. The apparatus as claimed in claim 2, wherein the one or more summing units are configured to sum together payload data of packets with the same header.

5. The apparatus as claimed in claim 2, wherein the one or more summing units are configured to sum together payload data of packets with different headers.

6. The apparatus as claimed in claim 1, wherein said summing of data is based on external rules.

7. The apparatus as claimed in claim 5, wherein said one or more summing units are configured to sum payload data of packets with different addresses.

8. The apparatus as claimed in claim 5, wherein said one or more summing units are configured to sum payload data of packets with different types of data.

9. The apparatus as claimed in claim 5, wherein said one or more summing units are configured to sum payload data of packets with different time stamps.

10. The apparatus as claimed in claim 4, wherein at least one of said plurality of outputs is configured to output a packet comprising the summed data and said same header.

11. The apparatus as claimed in claim 1, comprising one or more address extracting units are configured to extract the address information from said data.

12. The apparatus as claimed in claim 11, wherein said one or more address extracting units configured to start extracting the address information before all of a packet is received.

13. The apparatus as claimed in claim 2, wherein said payload data is summed at the same time or after the header has been output by at least one of said plurality of outputs.

14. The apparatus as claimed in claim 1, wherein the one or more inputs comprises a plurality of inputs and said one or more summing units are configured to take into account identities of the plurality of inputs when summing the data.

15. The apparatus as claimed in claim 1, wherein the apparatus is configured to identify one or more of said plurality of outputs of said apparatus.

16. The apparatus as claimed in claim 15, wherein said identifying one or more of said plurality of outputs of said apparatus is provided by a look up table.

17. The apparatus as claimed in claim 1, wherein separate summing units are provided for each output.

18. The apparatus as claimed in claim 15, wherein the data to be summed is directed to a summing unit associated with the identified output.

19. The apparatus as claimed in claim 1, wherein said one or more summing units are provided with a plurality of adder stages.

20. The apparatus as claimed in claim 1, wherein said data comprise spread spectrum data.

21. The apparatus as claimed in claim 1, wherein the data which is summed together is such that different data of the summed data can be distinguished from each other.

22. A base station comprising one or more apparatuses, each of said apparatuses comprising:
one or more inputs configured to receive a plurality of data packets, said data packets comprising payload data and address information;
one or more summing units configured to arithmetically sum at least a portion of original payload data of at least two of said data packets in dependence on a comparison of the address information of said at least two data packets to generate new payload data, said new payload data taking the place of said original payload data of said at least two of said data packets; and
a plurality of outputs configured to output said new payload data in place original payload data used in its generation, said summing units being configured to route said new payload data to one or more of said plurality of outputs.

23. The base station as claimed in claim 22, wherein a plurality of said apparatus is provided in said base station.

24. The base station as claimed in claim 23, wherein said plurality of said apparatus comprises nodes in a packet based baseband radio frequency bus.

25. The base station as claimed in claim 22, wherein said summed data is directed to a predetermined one or more beam or antenna of said base station.

26. The base station as claimed in claim 22, wherein said data to be transmitted by said base station on a carrier output is summed together.

27. The apparatus as claimed in claim 1, wherein at least some data is summed as at least some data is output.

28. The apparatus as claimed in claim 1, wherein said apparatus is configured to process and route data simultaneously.

29. A method, comprising:
receiving a plurality of data packets, said data packets comprising payload data and address information;
comparing the address information of at least two of said data packets;
arithmetically summing at least a portion of original payload data of said at least two of data packets in dependence on the result of the comparison to generate new payload data, said new payload data taking the place of said original payload data of said at least two of said data packets; and
routing said new payload data in place of original payload data used in its generation to at least one of a plurality of outputs.

30. The method as claimed in claim 29, wherein payload data of data packets having the same address information are summed together.

31. The method as claimed in claim 29, wherein at least portions of the summing and routing steps take place at the same time.

32. An apparatus, comprising:
input means for receiving a plurality of data packets, said data packets comprising payload data and address information;
summing means for arithmetically summing at least a portion of original payload data of at least two
of said data packets in dependence on a comparison of the address information of said
at least two data packets to generate new payload data, said new payload data taking the place of said original payload data of said at least two of said data packets; and
a plurality of output means for outputting said new payload data in place original payload data used in its generation, said summing means
routing said new payload data to one or more of said plurality of output means.

33. A base station comprising one or more apparatuses, each of said apparatuses comprising:
input means for receiving a plurality of data packets, said data packets comprising payload data and address information;
summing means for arithmetically summing at least a portion of original payload data of at least two of said data packets in dependence on a comparison of the address information of said at least two data packets to generate new payload data, said new payload data taking the place of said original payload data of said at least two of said data packets; and
a plurality of output means for outputting said new payload data in place of original payload data used in its generation, said summing means routing said new payload data to one or more of said plurality of output means.

* * * * *